United States Patent
Arai et al.

(10) Patent No.: US 10,103,387 B2
(45) Date of Patent: Oct. 16, 2018

(54) METHOD FOR PRODUCING FUEL CELL CATALYST LAYER

(71) Applicant: TOYOTA JIDOSHA KABUSHIKI KAISHA, Toyota-shi, Aichi-ken (JP)

(72) Inventors: Tatsuya Arai, Susono (JP); Takashi Ozaki, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 38 days.

(21) Appl. No.: 15/404,785

(22) Filed: Jan. 12, 2017

(65) Prior Publication Data
US 2017/0207463 A1  Jul. 20, 2017

(30) Foreign Application Priority Data
Jan. 15, 2016 (JP) ................. 2016-006029

(51) Int. Cl.
*H01M 8/00* (2016.01)
*H01M 4/88* (2006.01)
*H01M 4/92* (2006.01)
*H01M 4/86* (2006.01)

(52) U.S. Cl.
CPC ....... *H01M 4/8817* (2013.01); *H01M 4/8892* (2013.01); *H01M 4/921* (2013.01); *H01M 4/926* (2013.01); *H01M 4/8605* (2013.01)

(58) Field of Classification Search
CPC ..................................................... H01M 8/00
See application file for complete search history.

(56) References Cited

U.S. PATENT DOCUMENTS

| 2004/0131919 | A1 | 7/2004 | Yasumoto et al. | |
| 2004/0214058 | A1* | 10/2004 | Tada | H01M 4/8605 |
| | | | | 429/492 |
| 2009/0208751 | A1 | 8/2009 | Green et al. | |
| 2009/0239117 | A1 | 9/2009 | Yamagata | |
| 2014/0205929 | A1* | 7/2014 | Mashio | B01J 23/42 |
| | | | | 429/482 |
| 2015/0280246 | A1 | 10/2015 | Kato et al. | |
| 2016/0329571 | A1 | 11/2016 | Matsumoto et al. | |

FOREIGN PATENT DOCUMENTS

| JP | 2002-025560 A | 1/2002 |
| JP | 2004-311060 A | 11/2004 |
| JP | 2005-166310 A | 6/2005 |
| JP | 2006-286329 A | 10/2006 |
| JP | 2009-259782 A | 11/2009 |

(Continued)

*Primary Examiner* — Jacob B Marks
(74) *Attorney, Agent, or Firm* — Hunton Andrews Kurth LLP

(57) ABSTRACT

A method for producing a fuel cell catalyst layer, which is able to allow an ionomer to sufficiently penetrate to the inside of the fine pores of a support with fine pores. The method is a method for producing a fuel cell catalyst layer in which a catalyst is supported on the support with fine pores and is coated with an ionomer, the method comprising: hydrophilizing a surface of the support by use of nitric acid, and dispersing the support, the catalyst and the ionomer by use of a ball mill after the hydrophilizing, wherein the amount of acidic functional groups per specific surface area of the support is set to 1.79 µmol/m² or more in the hydrophilizing.

3 Claims, 2 Drawing Sheets

(56) References Cited

FOREIGN PATENT DOCUMENTS

| | | |
|---|---|---|
| JP | 2012-146438 A | 8/2012 |
| JP | 2013-045694 A | 3/2013 |
| JP | 2013-137954 A | 7/2013 |
| JP | 2014-082077 A | 5/2014 |
| JP | 2015-071784 A | 4/2015 |
| WO | 2007/126153 A1 | 11/2007 |
| WO | 2015/088025 A1 | 6/2015 |

* cited by examiner

METHOD FOR PRODUCING FUEL CELL CATALYST LAYER

CROSS-REFERENCE TO RELATED APPLICATION

The present application claims priority to Japanese Patent Application No. 2016-006029 filed on Jan. 15, 2016, which is incorporated herein by reference in its entirety.

TECHNICAL FIELD

This disclosure relates to a method for producing a fuel cell catalyst layer.

BACKGROUND

In the fuel cell field, there is an attempt to improve fuel cell performance by focusing on catalyst layers.

For example, such a catalyst layer is disclosed in Patent Literature 1, that a catalyst is uniformly supported on the surface of a mesoporous carbon support since the average pore diameter of the support agrees with the average particle diameter of a catalyst complex.

Patent Literature 1: Japanese Patent Application Laid-Open (JP-A) No. 2015-071784
Patent Literature 2: JP-A No. 2002-025560
Patent Literature 3: International Publication No. WO2007-126153
Patent Literature 4: JP-A No. 2004-311060

SUMMARY

However, the following problem arises: only by the structure as disclosed in Patent Literature 1, that is, only by the structure in which the average pore diameter of a support with fine pores agrees with the average particle diameter of a catalyst complex, an ionomer cannot sufficiently penetrate to the inside of the fine pores of the support such as mesoporous carbon, and a fuel cell using such a structure cannot provide sufficient power generation performance in a low humidity condition.

The disclosed embodiments were achieved in light of the above circumstance. An object of the disclosed embodiments is to provide a method for producing a fuel cell catalyst layer, which is able to allow an ionomer to sufficiently penetrate to the inside of the fine pores of a support with fine pores.

In a first embodiment, there is provided a method for producing a fuel cell catalyst layer in which a catalyst is supported on the support with fine pores and is coated with an ionomer, the method comprising: hydrophilizing a surface of the support by use of nitric acid, and dispersing the support, the catalyst and the ionomer by use of a ball mill after the hydrophilizing, wherein the amount of acidic functional groups per specific surface area of the support is set to 1.79 µmol/m$^2$ or more in the hydrophilizing.

In the method for producing the fuel cell catalyst layer, the average pore diameter of the support may be 2 nm or more and 10 nm or less.

In the method for producing the fuel cell catalyst layer, the support may be at least one selected from the group consisting of a carbon support, a metal nitride support, a metal carbide support and a metal oxide support.

The method for producing the fuel cell catalyst layer can be provided according to the disclosed embodiments, which is able to allow the ionomer to sufficiently penetrate to the inside of the fine pores of the support with the fine pores.

DETAILED DESCRIPTION

Figure 1:
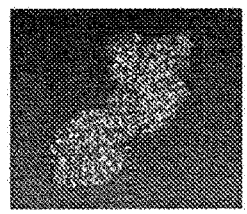
FIG. 1 is a TEM image of the fuel cell catalyst of Example 1.

The method for producing the fuel cell catalyst layer according to the disclosed embodiments, is a method for producing a fuel cell catalyst layer in which a catalyst is supported on the support with fine pores and is coated with an ionomer, the method comprising: hydrophilizing a surface of the support by use of nitric acid, and dispersing the support, the catalyst and the ionomer by use of a ball mill after the hydrophilizing, wherein the amount of acidic functional groups per specific surface area of the support is set to 1.79 µmol/m$^2$ or more in the hydrophilizing.

In such a catalyst-supported support that catalyst particles (e.g., Pt particles or Pt alloy particles) are supported in the inside of the support with fine pores, the catalyst particles do not fill gaps between the primary particles of the support, and gas easily diffuses to the inside of the support particles in the form of aggregates; therefore, the utilization rate of the catalyst particles is high and excellent membrane electrode assembly (MEA) performance is obtained.

However, the following problem arises: since it is difficult to allow an ionomer to penetrate to the inside of the fine pores of the support, MEA performance is lowered in a high-temperature and low-humidity condition.

It was found that an ionomer can sufficiently penetrate to the inside of the fine pores of the support with the fine pores, by hydrophilizing the surface of the support by use of nitric acid and then dispersing the support, catalyst and ionomer by use of a ball mill.

To allow an ionomer to sufficiently penetrate to the inside of the fine pores of the support, it is estimated that not only controlling the average pore diameter of the support, the average particle diameter of the catalyst and the size of ionomer aggregates, but also hydrophilizing the surface of the support and providing a propulsive force for pushing the ionomer into the inside of the fine pores of the support by use of a ball mill, are needed.

By carrying out both the hydrophilizing treatment and the dispersing treatment, the ionomer can penetrate to the inside of the fine pores of the support, and the catalyst can be certainly coated with the ionomer. Therefore, even at low humidity, protons can be certainly supplied to the catalyst, and a fuel cell that is excellent in power generation performance at low humidity can be produced.

Also, according to the disclosed embodiments, MEA performance is increased in a high-temperature and low-humidity condition. Therefore, external humidification is no longer needed, and fuel cell system simplification can be realized.

The method for producing the fuel cell catalyst layer according to the disclosed embodiments includes at least (1) hydrophilizing and (2) dispersing.

The thickness of the fuel cell catalyst layer obtained by the production method of the disclosed embodiments is not particularly limited. The upper limit may be 50 μm or less. Also, it may be 12 μm or less. The lower limit may be 2 μm or more. Also, it may be 8 μm or more.

(1) Hydrophilizing

The hydrophilizing is hydrophilizing the surface of the support by use of nitric acid.

The hydrophilizing treatment uses volatile nitric acid. In the case of using non-volatile acid, acid removal is quite difficult, and when the acid remains in the inside of the fine pores of the support, the acid may poison (be adsorbed onto) the catalyst surface and decrease power generation performance. Also, acids with high oxidizing power and those that leave chloride ions, such as hydrochloric acid and perchloric acid, are not usable.

The concentration of the nitric acid is not particularly limited. It may be 0.1 to 5 mol/L and 0.5 to 1.0 mol/L.

The hydrophilizing treatment temperature is not particularly limited. It may be 60 to 90° C., 70 to 85° C. and 80° C.

The hydrophilizing treatment time is not particularly limited. It may be 1 to 48 hours and 8 to 24 hours.

In the hydrophilizing, the amount of acidic functional groups per specific surface area of the support is set to 1.79 μmol/m$^2$ or more. In particular, in the case of 0.5 mol/L nitric acid, the hydrophilizing treatment is carried out at 80° C. for 24 hours or more. In the case of 1.0 mol/L nitric acid, the hydrophilizing treatment is carried out at 80° C. for 8 hours or more.

The hydrophilizing treatment is carried out by the following method, for example: the support, the nitric acid, alcohol and ultrapure water are put in a beaker, and the mixture is heated with stirring.

The support is not particularly limited. As the support, examples include, but are not limited to, a carbon support, a metal nitride support, a metal carbide support and a metal oxide support.

As the carbon support, examples include, but are not limited to, carbon particles such as Ketjen Black (product name; manufactured by: Ketjen Black International Company), Vulcan (product name; manufactured by: Cabot), Norit (product name; manufactured by: Norit), Black Pearls (product name; manufactured by: Cabot) and Acetylene Black (product name; manufactured by: Chevron); carbon fibers such as carbon nanotubes, carbon nanohorns, carbon nanowalls and carbon nanofibers; and electroonductive carbonaceous materials such as carbon alloys.

As the metal nitride support, examples include, but are not limited to, TiN.

As the metal carbide support, examples include, but are not limited to, TiC.

As the metal oxide support, examples include, but are not limited to, complex oxides including $SnO_2$ doped with W or Sb (e.g., W—$SnO_2$, Sb—$SnO_2$) and $TiO_2$ doped with Nb or Ta (e.g., $Nb_xTi_yO_2$ ($x+y \leq 1$) and $Ta_zTi_wO_2$ ($z+w \leq 1$)); and $TiO_2$ with oxygen defects (e.g., $Ti_4O_7$).

The average particle diameter of the support is not particularly limited. It may be 10 to 100 nm.

The average pore diameter of the fine pores of the support is not particularly limited. It may be 2 nm or more and 10 nm or less. When the average pore diameter is less than 2 nm, the catalyst may not penetrate to the inside of the fine pores of the support.

The support used in the hydrophilizing may be the support alone, or it may be a catalyst-supported support on which the below-described catalyst is supported.

In the disclosed embodiments, the average particle diameter of the particles is calculated by a general method. An example of the method for calculating the average particle diameter of the particles is as follows. First, for a particle shown in an image taken at an appropriate magnification (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

(2) Dispersing

The dispersing is dispersing the support, catalyst and ionomer by use of a ball mill after the hydrophilizing.

In the disclosed embodiments, the ball mill is a conventionally-known device for rotating a container in which balls and raw materials are contained. It is also a concept that encompasses a bead mill.

The catalyst used in the dispersing may be the catalyst alone, or it may be a catalyst in a state of being supported on a support (i.e., a catalyst-supported support).

A solvent is used in the dispersing. As the solvent, examples include, but are not limited to, water, alcohol and mixed solvents thereof.

In the dispersing, the ionomer may be put in the container after the solvent is put therein.

As the ionomer, examples include, but are not limited to, Nafion (trade name)-based fluorinated sulfonic acid polymer dispersions.

The mixing ratio of the catalyst-supported support and the ionomer is not particularly limited. It may be 1:0.75 (catalyst-supported support:ionomer).

As the catalyst, examples include, but are not limited to, platinum and platinum alloys.

As the platinum alloys, examples include, but are not limited to, alloys of Pt and Ru, Pt and Sn, Pt and Mo, Pt and Ni and Pt and Co.

The form of the catalyst is not particularly limited. It may be a particle form.

The ball mill is not particularly limited. As the ball mill, examples include, but are not limited to, a planetary ball mill.

The material of the balls is not particularly limited. For example, zirconia or alumina balls may be used.

The diameter of the balls is not particularly limited. It may be 0.5 to 2 mm.

The plate rotational frequency of the ball mill is not particularly limited. It may be 300 to 500 rpm.

The ball mill rotating time is not particularly limited. It may be 3 hours or more, 6 hours or more, and 100 hours or less.

The method for forming the catalyst layer is not particularly limited. For example, the catalyst layer may be formed by the following method: after the dispersing, the catalyst is coated with the ionomer to obtain a fuel cell catalyst; the fuel cell catalyst is added in a perfluorocarbon sulfonic acid resin dispersion to prepare a catalyst ink; the catalyst ink is applied to a surface of a resin film or metal plate and dried, thereby forming the catalyst layer.

The method for applying the catalyst ink is not particularly limited. It may be a conventionally-known method.

EXAMPLES

Example 1

[Hydrophilizing]

As a support, a mesoporous carbon nanodendrite having a pore diameter of 2 nm or more and 10 nm or less (MCND, manufactured by: Nippon Steel & Sumikin Chemical Co., Ltd.) was used.

As a catalyst, PtCo particles (Pt:Co=7:1) were used.

The catalyst was supported on the support to obtain a catalyst-supported support.

Then, a hydrophilizing treatment was carried out by immersing the catalyst-supported support in 0.5 mol/L (0.5 N) nitric acid at 80° C. for 24 hours. Then, the nitric acid was removed from the catalyst-supported support.

[Calculation of the Amount of Acidic Functional Groups Per Specific Surface Area of the Support]
(Measurement of the Specific Surface Area)

Measurement device: Automatic specific surface area/pore size distribution measuring device BELSORP-mini II (manufactured by: BEL Japan, Inc.)

Pre-treatment condition: Sample was put in a measurement cell and vacuum deaerated at 100° C. for 2 hours.

Number of measurements carried out: One measurement

Cell size: 1.8 cm$^3$ (Stem outer diameter 9 mm)

Adsorbed gas: Nitrogen gas

Measured item: Adsorption/desorption isotherm at predetermined measurement points Analyzed item: Specific surface area by multipoint BET The pre-treated, catalyst-supported support was put in a measurement cell having a constant volume, and nitrogen gas was introduced into the cell. Pressure variation before and after the gas introduction was determined as adsorption of a monolayer of $N_2$ and converted into the amount of the adsorbed $N_2$ monolayer (cm$^3$/g) per mass of the support (see the following formula (1)). The monolayer means such a state that molecules adsorbed onto the support surface (e.g., $N_2$ molecules or ammonia molecules) are not overlapped with each other, and the thickness is a thickness of just one molecule.

$$p/v(p_0-p)=1/v_m c+(c-1/v_m c) \times p/p_0 \quad \text{Formula (1)}$$

$p_0$: Saturated vapor pressure of adsorber at measured temperature
p: Pressure at adsorption equilibrium
v: Adsorbed amount at adsorption equilibrium
$v_m$: Amount of adsorbed monolayer
c: Condensation coefficient of adsorbed molecules The carbon rate of the catalyst-supported support was measured by the NCH method. Assuming that $N_2$ is not adsorbed to the PtCo catalyst particles, the specific surface area of the catalyst-supported support was calculated by the following formula (2). The specific surface area thus calculated was determined as the specific surface area of the support.

$$S = A \times vm \times N/W \quad \text{Formula (2)}$$

S: Specific surface area
A: Sectional area of adsorbed molecule
N: Avogadro's number
W: Amount of sample
$v_m$: Amount of adsorbed monolayer (Measurement of Adsorbed Ammonia Amount)

Measurement device: High-performance, automatic adsorbed gas amount measuring device AC-1-C/VP/TCD/MS (manufactured by: Quantachrome)

Measurement principle: Automatic adsorbed gas amount measurement by constant volume method Pre-treatment condition: Sample was put in a measurement cell and vacuum deaerated at 100° C. for 2 hours.

Cell size: Small cell of 1.5 cm$^3$ (Stem outer diameter 9 mm)

Adsorbed gas: Ammonia

Measurement pressure range: 2 to 800 mmHg

Measured item: Chemical adsorption amount

The pre-treated catalyst-supported support was put in a measurement cell having a constant volume, and ammonia gas was introduced into the cell. Pressure variation before and after the gas introduction was determined as adsorption of a monolayer of ammonia and converted into the amount of the adsorbed ammonia monolayer (mol/g) per mass of the support.

Then, the amount of the adsorbed ammonia monolayer (mol/g) per mass of the support was divided by the specific surface area of the support (m$^2$/g), thereby calculating the amount of the acidic functional groups per specific surface area of the support (μmol/m$^2$). The amount of the acidic functional groups per specific surface area of the support of Example 1 and those of the below-described Examples 2 and 3 and Comparative Examples 1 to 5, are shown in Table 2.

[Dispersing]

Next, a perfluorocarbon sulfonic acid resin dispersion (product name: Nafion; manufactured by: DuPont) (solid content: 10% by mass, IPA: 45% by mass, water: 45% by mass) was used as an ionomer. In addition, the container of a planetary ball mill and zirconia beads (diameter 1 mm) were used.

Then, the zirconia beads, the catalyst-supported support and the ionomer were put in the container of the planetary ball mill. The container was hermetically closed, absolutely. The container was installed in the planetary ball mill (product name: P7; manufactured by: Fritsch) and rotated at a plate rotational frequency of 300 rpm for 6 hours, thereby obtaining a fuel cell catalyst in which the catalyst is coated with the ionomer.

[Calculation of the Rate of the Ionomer in the Inside of the Support]

For the thus-obtained fuel cell catalyst, the volume of the ionomer in the inside of the support and the volume of the ionomer of the whole support were measured by 3D-TEM, and the rate of the ionomer in the inside of the support was calculated.

In particular, the volume of the ionomer in the inside of the support was obtained as follows: the ionomer was dyed with $RuO_2$; on the assumption that the position of the $RuO_2$ is the position of the ionomer, the ionomer was continuously observed with a TEM at different angles; sectional images thus observed are connected to form a stereoscopic image; and based on the stereoscopic image, the volume of the ionomer in the inside of the carbon was calculated.

[Calculation of Ionomer Coating Rate]

Using a fluorine solvent (product name: Fluorinert FC-3283; manufactured by: 3M), the electrochemical surface area (ECSA) of the fuel cell catalyst was measured.

Also, using water, the electrochemical surface area (ECSA) of the thus-obtained fuel cell catalyst was measured.

Then, the ionomer coating rate of the fuel cell catalyst was calculated by comparing the electrochemical surface areas. The ionomer coating rate of the fuel cell catalysts of Example 1 and those of the below-described Examples 2 and 3 and Comparative Examples 1 to 5, are shown in Table 2.

[Production of Catalyst Layers]

The fuel cell catalyst was mixed with a perfluorocarbon sulfonic acid resin, ethanol and water by stirring, thereby preparing a catalyst ink.

The catalyst ink was sprayed to both sides of a perfluorocarbon sulfonic acid resin membrane. The applied ink was dried to form catalyst layers, thereby obtaining a membrane-catalyst layer assembly. The thickness of the catalyst layers was set to 10 μm.

[Production of Fuel Cell]

The thus-obtained membrane-catalyst layer assembly was sandwiched between carbon papers for use as gas diffusion layers and hot pressed to obtain a membrane electrode assembly. The membrane electrode assembly was further sandwiched between two separators (carbon separators) to produce a fuel cell.

Example 2

Catalyst layers and a fuel cell were produced in the same manner as Example 1, except that in the "Hydrophilizing", the hydrophilizing treatment was carried out by immersing the catalyst-supported support in 1 mol/L nitric acid at 80° C. for 16 hours.

Example 3

Catalyst layers and a fuel cell were produced in the same manner as Example 1, except that in the "Production of catalyst layers", the thickness of the catalyst layers was set to 50 μm.

Comparative Example 1

Catalyst layers and a fuel cell were produced in the same manner as Example 1, except that in the "Hydrophilizing", the hydrophilizing treatment was carried out by bringing the catalyst-supported support into contact with 100% $H_2$ at 800° C.

Comparative Example 2

Catalyst layers and a fuel cell were produced in the same manner as Example 1, except that in the "Hydrophilizing", the hydrophilizing treatment was carried out by bringing the catalyst-supported support into contact with dry air at 350° C.

Comparative Example 3

Catalyst layers and a fuel cell were produced in the same manner as Example 1, except that in the "Hydrophilizing", the hydrophilizing treatment was carried out by bringing the catalyst-supported support into contact with 0.5 mol/L nitric acid at room temperature for 24 hours.

Comparative Example 4

Catalyst layers and a fuel cell were produced in the same manner as Example 1, except that in the "Dispersing", a homogenizer was used for dispersion, in place of the ball mill.

Comparative Example 5

Catalyst layers and a fuel cell were produced in the same manner as Example 1, except that in the "Hydrophilizing", the hydrophilizing treatment was carried out by immersing the catalyst-supported support in 0.5 mol/L nitric acid at room temperature for 24 hours, and in the "Production of catalyst layers", the thickness of the catalyst layers was set to 50 μm.

[Rate of the Ionomer in the Inside of the Support]

Figure 2:
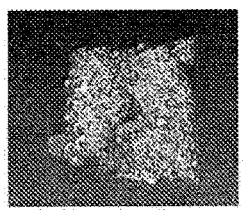
FIG. 2 is a TEM image of the fuel cell catalyst of Comparative Example 3.
Figure 3:
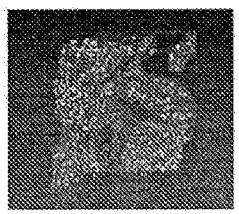
FIG. 3 is a TEM image of the fuel cell catalyst of Comparative Example 4.

FIG. 1 shows a TEM image of the fuel cell catalyst (after the dispersing) of Example 1. FIG. 2 shows a TEM image of the fuel cell catalyst (after the dispersing) of Comparative Example 3. FIG. 3 shows a TEM image of the fuel cell catalyst (after the dispersing) of Comparative Example 4.

Table 1 shows the rate of PtCo particles and the rate of the ionomer in the inside of the support contained in the fuel cell catalyst (after the dispersing) of Example 1 and those of Comparative Examples 3 and 4.

The rate of the PtCo particles in the inside of the support was obtained as follows: the number of all of the PtCo particles in a 100×100×200 nm view was obtained by a transmission electron microscope (TEM); in the same view, the observation angle was continuously changed; the rate of the PtCo particles that showed no change in the particle position, was calculated on the assumption that such PtCo particles exist in the inside of the support.

As shown in Table 1, the rate of the PtCo particles in the inside of the support is 79% by volume in Example 1, 90% by volume in Comparative Example 3, and 87% by volume in Comparative Example 4.

As shown in Table 1, the rate of the ionomer in the inside of the support is 86% by volume in Example 1, 0% by volume in Comparative Example 3, and 14% by volume in Comparative Example 4.

As shown in FIGS. 1 to 3, it is clear that in Example 1, most of the ionomer exists in the inside of the support, and in Comparative Examples 3 and 4, much of the ionomer also exists in areas other than the inside of the support.

Therefore, as shown in FIGS. 1 to 3 and Table 1, it is clear that the rate of the ionomer in the inside of the support is markedly higher in Example 1 than in Comparative Examples 3 and 4.

[Ionomer Coating Rate of the Fuel Cell Catalyst]

As shown in Table 2, the ionomer coating rate of the fuel cell catalyst is 95% in Example 1, 98% in Example 2, 95% in Example 3, 46% in Comparative Example 1, 53% in Comparative Example 2, 69% in Comparative Example 3, 76% in Comparative Example 4, and 69% in Comparative Example 5.

As shown in Table 2, the ionomer coating rate of the fuel cell catalyst is 95% or more in Examples 1 to 3 and is about 46 to 76% in Comparative Examples 1 to 5. Therefore, it is clear that the ionomer coating rate of the fuel cell catalyst is markedly higher in Examples 1 to 3 than in Comparative Examples 1 to 5.

As shown in Table 2, as a result of comparing Example 1 in which the dispersing treatment was carried out by the ball mill and Comparative Example 4 in which the dispersing treatment was carried out by the homogenizer, it is clear that the ionomer coating rate is 1.25 times higher in Example 1 than in Comparative Example 4. Therefore, it is clear that the ionomer coating rate of the fuel cell catalyst can be increased by setting the amount of the acidic functional groups per specific surface area of the support to 1.79 μmol/m² or more in the hydrophilizing and carrying out the dispersing treatment by use of a ball mill in the dispersing, not a homogenizer.

TABLE 1

| | Rate of the PtCo in the inside of the support (% by volume) | Rate of the ionomer in the inside of the support (% by volume) |
|---|---|---|
| Example 1 | 79 | 86 |
| Comparative Example 3 | 90 | 0 |
| Comparative Example 4 | 87 | 14 |

TABLE 2

| | Hydrophilizing treatment | Dispersing treatment | Thickness of catalyst layers ($\mu m$) | Amount of acidic functional groups ($\mu mol/m^2$) | Ionomer coating rate (%) | Humidity independence (%) | Voltage at 80° C./100% RH (V@0.2 A/cm$^2$) | Voltage at 80° C./40% RH (V@0.2 A/cm$^2$) |
|---|---|---|---|---|---|---|---|---|
| Example 1 | 0.5N HNO$_3$ 24 h, 80° C. | BM | 10 | 1.79 | 95 | 99.3 | 0.8780 | 0.8719 |
| Example 2 | 1N HNO$_3$ 16 h, 80° C. | BM | 10 | 2.2 | 98 | 98.2 | 0.8705 | 0.8552 |
| Example 3 | 0.5N HNO$_3$ 24 h, 80° C. | BM | 50 | 1.79 | 95 | 93.8 | 0.8617 | 0.8086 |
| Comparative Example 1 | 800° C./100% H$_2$ | BM | 10 | 0.29 | 46 | 93.5 | 0.8424 | 0.7874 |
| Comparative Example 2 | 350° C./Air | BM | 10 | 0.35 | 53 | 94.3 | 0.8354 | 0.7876 |
| Comparative Example 3 | 0.5N HNO$_3$ 24 h, r.t. | BM | 10 | 1.09 | 69 | 97 | 0.8770 | 0.8510 |
| Comparative Example 4 | 0.5N HNO$_3$ 24 h, 80° C. | FM | 10 | 1.79 | 76 | 96.9 | 0.8750 | 0.8480 |
| Comparative Example 5 | 0.5N HNO$_3$ 24h, r.t. | BM | 50 | 1.09 | 69 | 92.8 | 0.8459 | 0.7850 |

BM: Ball mill
FM: Homogenizer

[Evaluation of Power Generation Performance in High-Temperature and High-Humidity Condition]

In the following condition, Power generation was carried out by the fuel cells obtained in Examples 1 to 3 and Comparative Examples 1 to 5.
   Anode gas: Hydrogen gas at a relative humidity (RH) of 100% (bubbler dew point 80° C.)
   Cathode gas: Pure oxygen at a relative humidity (RH) of 100% (bubbler dew point 80° C.)
   Cell temperature (cooling water temperature): 80° C.

Current density-voltage curves were obtained by the power generation. Voltages at a current density of 0.2 A/cm$^2$ are shown in Table 2.

As shown in Table 2, it is clear that according to the evaluation of the power generation performance in the high-temperature and high-humidity condition (80° C., 100% RH), the voltage at a current density of 0.2 A/cm$^2$ is 0.8780 V in Example 1, 0.8705 V in Example 2, 0.8617 V in Example 3, 0.8424 V in Comparative Example 1, 0.8354 V in Comparative Example 2, 0.8770 V in Comparative Example 3, 0.8750 V in Comparative Example 4, and 0.8459 V in Comparative Example 5.

[Evaluation of Power Generation Performance in High-Temperature and Low-Humidity Condition]

In the following condition, power generation was carried out by the fuel cells obtained in Examples 1 to 3 and Comparative Examples 1 to 5.
   Anode gas: Hydrogen gas at a relative humidity (RH) of 40% (bubbler dew point 80° C.)
   Cathode gas: Pure oxygen at a relative humidity (RH) of 40% (bubbler dew point 80° C.)
   Cell temperature (cooling water temperature): 80° C.

Current density-voltage curves were obtained by the power generation. Voltages at a current density of 0.2 A/cm$^2$ are shown in Table 2.

As shown in Table 2, according to the evaluation of power generation performance in the high-temperature and low-humidity condition (80° C., 40% RH), it is clear that the voltage at a current density of 0.2 A/cm$^2$ is 0.8719 V in Example 1, 0.8552 V in Example 2, 0.8086 V in Example 3, 0.7874 V in Comparative Example 1, 0.7876 V in Comparative Example 2, 0.8510 V in Comparative Example 3, 0.8480 V in Comparative Example 4, and 0.7850 V in Comparative Example 5.

[Evaluation of Humidity Independence of IV Performance]

Voltage@40% RH/voltage@100% RH at 80° C. and 0.2 A/cm$^2$ of the fuel cell obtained in Example 1 was calculated. Then, the difference between the voltage at the high temperature and high humidity at 0.2 A/cm$^2$ and the voltage at the high temperature and low humidity at 0.2 A/cm$^2$ (that is, humidity independence (%) of IV performance) was evaluated. The humidity independence means that when the humidity independence is 100%, the fuel cell has IV performance that is hardly influenced by humidity. In the same manner as Example 1, the fuel cells obtained in Examples 2 and 3 and Comparative Examples 1 to 5 were evaluated. The results are shown in Table 2.

Figure 4:
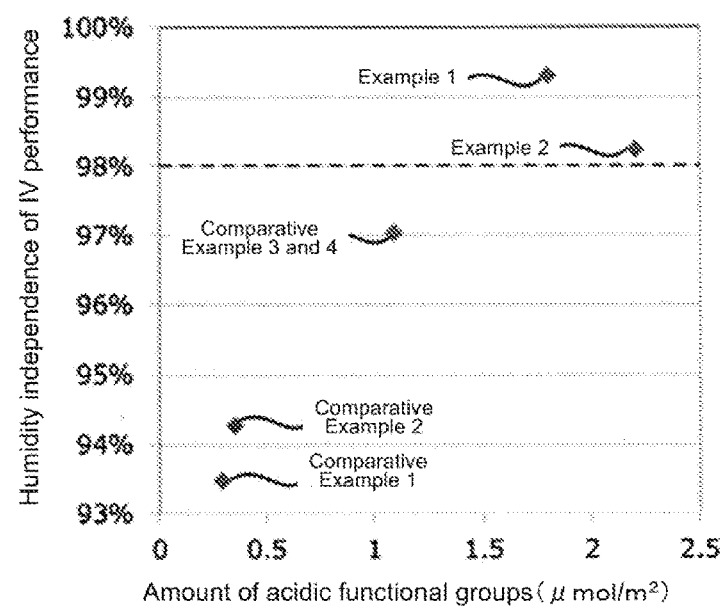
FIG. 4 is a view showing, for the supports of Examples 1 and 2 and Comparative Examples 1 to 4, the humidity independence of IV performance with respect to the amount of acidic functional groups per specific surface area.

For the supports of the fuel cells obtained in Examples 1 and 2 and Comparative Examples 1 to 4, the humidity independence of the IV performance with respect to the amount of the acidic functional groups per specific surface area, is shown in FIG. 4.

As shown in FIG. 4, the humidity independence of the IV performance is higher in Examples 1 and 2 than in Comparative Examples 1 to 4. From this result, it is clear that even in the high-temperature and low-humidity condition, Examples 1 and 2 show approximately the same performance as that in the high-temperature and high-humidity condition.

From Table 2 and FIG. 4, it is clear that when the catalyst layer thickness is 10 μm, the humidity independence of the IV performance is as high as 98% or more if the amount of the acidic functional groups per specific surface area of the support is 1.79 µmol/m² or more.

From the above results, it is thought that the disclosed embodiments can achieve the same results even in a non-humidified or 20% RH condition.

[Evaluation of Temperature Characteristics]

Figure 5:
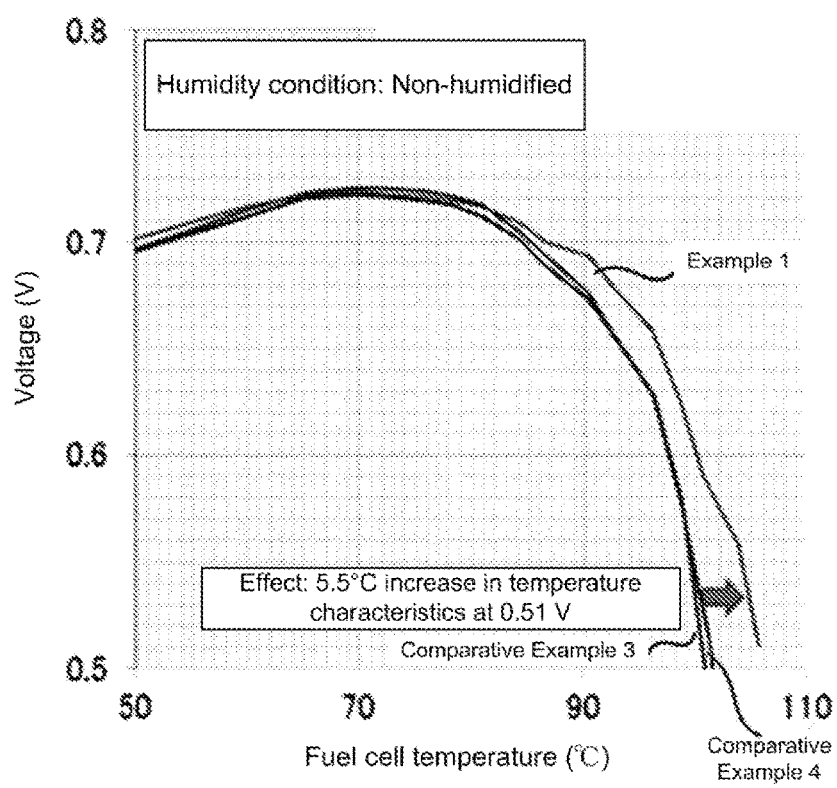
FIG. 5 is a view showing the voltage-fuel cell temperature curves of fuel cells obtained in Example 1 and Comparative Examples 3 and 4.

The fuel cell obtained in Example 1 was measured for the voltage when the temperature is increased from 50° C. to 110° C. in a non-humidified, constant current density (1.1 A/cm²) condition. In the same manner as Example 1, the fuel cells obtained in Comparative Examples 3 and 4 were measured for the voltage. The measurement results (voltage-fuel cell temperature) are shown in FIG. 5.

As a result of comparing Example 1 and Comparative Examples 3 and 4, it was found that the temperature characteristic is higher in Example 1 (+5.5° C.@0.51 V/1.1 A/cm²) than in Comparative Examples 3 and 4.

From the above results, it is clear that according to the disclosed embodiments, the high temperature performance is increased; therefore, the electrode area can be decreased and, as a result, the fuel cell can be downsized.

[Evaluation of Catalyst Layer Thickness]

As shown in Table 2, as a result of comparing Example 3 (in which the catalyst layers having a thickness of 50 µm were used) and Examples 1 and 2 (in which the catalyst layers having a thickness of 10 µm were used), it is clear that the humidity independence is higher in Examples 1 and 2.

Therefore, it is clear that the humidity independence can be increased by reducing the catalyst layer thickness.

The invention claimed is:

1. A method for producing a fuel cell catalyst layer in which a catalyst is supported on a support with fine pores and is coated with an ionomer, the method comprising steps of:

hydrophilizing a surface of the support by use of nitric acid; and dispersing the support, the catalyst and the ionomer by use of a ball mill after the hydrophilizing step, wherein an amount of acidic functional groups per specific surface area of the support on the surface of the support is set to 1.79 µmol/m² or more in the hydrophilizing step.

2. The method for producing the fuel cell catalyst layer according to claim 1, wherein an average pore diameter of the support is 2 nm or more and 10 nm or less.

3. The method for producing the fuel cell catalyst layer according to claim 1, wherein the support is at least one selected from the group consisting of a carbon support, a metal nitride support, a metal carbide support and a metal oxide support.

* * * * *